US012646503B2

(12) United States Patent
Lee et al.

(10) Patent No.: US 12,646,503 B2
(45) Date of Patent: Jun. 2, 2026

(54) METHOD, DEVICE AND NON-TRANSITORY COMPUTER READABLE MEDIUM FOR TRAINING MACHINE LEARNING MODELS

(71) Applicant: National Tsing Hua University, Hsinchu (TW)

(72) Inventors: Chi-Chun Lee, Hsinchu (TW); Ya-Tse Wu, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 212 days.

(21) Appl. No.: 18/766,302

(22) Filed: Jul. 8, 2024

(65) Prior Publication Data
US 2025/0069590 A1     Feb. 27, 2025

(30) Foreign Application Priority Data
Aug. 22, 2023    (TW) ................................. 112131571

(51) Int. Cl.
G10L 15/06        (2013.01)
G10L 21/02        (2013.01)

(52) U.S. Cl.
CPC ............ G10L 15/063 (2013.01); G10L 21/02 (2013.01)

(58) Field of Classification Search
USPC ...................................................... 704/1–504
See application file for complete search history.

(56) References Cited

U.S. PATENT DOCUMENTS

| | | | | |
|---|---|---|---|---|
| 11,650,968 | B2 * | 5/2023 | Nair ....................... | G06N 3/084 706/20 |
| 12,026,974 | B2 * | 7/2024 | Zhao ....................... | G06V 10/82 |
| 2020/0372342 | A1 * | 11/2020 | Nair .................... | G06F 16/2246 |
| 2022/0126864 | A1 * | 4/2022 | Moustafa .......... | B60W 60/0013 |
| 2023/0095685 | A1 * | 3/2023 | Greving ................ | G16B 15/20 706/14 |
| 2023/0222326 | A1 * | 7/2023 | Jafari ................... | G06N 3/0442 706/25 |
| 2025/0069590 | A1 * | 2/2025 | Lee ........................... | G06N 3/08 |
| 2025/0209336 | A1 * | 6/2025 | Lee ....................... | G16H 50/20 |
| 2026/0051316 | A1 * | 2/2026 | Jukic .................... | G10L 15/063 |

FOREIGN PATENT DOCUMENTS

| | | | | | |
|---|---|---|---|---|---|
| CN | 115176254 | A | * | 10/2022 | ............. G06F 30/27 |
| TW | 202135529 | A | * | 9/2021 | ............. G06N 3/045 |
| TW | 202240735 | A | | 10/2022 | |
| WO | WO-2022051855 | A1 | * | 3/2022 | ........... G06N 3/0442 |
| WO | WO-2026024858 | A1 | * | 1/2026 | |

* cited by examiner

*Primary Examiner* — Marcus T Riley
(74) *Attorney, Agent, or Firm* — ScienBiziP, P.C.

(57) ABSTRACT
A method for training a machine learning model is provided. In this method, samples are drawn from a first training set according to multiple weights for training the machine learning model in a first epoch. The first training set includes multiple levels corresponding to the multiple weights. After the first epoch, the machine learning model is evaluated using a validation set for multiple first performances at the multiple levels. Additionally, the weight that corresponds to each level is updated based on the first performances, and samples are redrawn from the first training set according to the updated weights for training the machine learning model in a second epoch that follows the first epoch. Moreover, an electronic device and a non-transitory computer-readable medium for utilizing the above method are also provided.

21 Claims, 4 Drawing Sheets

METHOD, DEVICE AND NON-TRANSITORY COMPUTER READABLE MEDIUM FOR TRAINING MACHINE LEARNING MODELS

CROSS-REFERENCE TO RELATED APPLICATION

The present application claims the benefit of and priority to Taiwan Patent Application No. 112131571, filed on Aug. 22, 2023, the contents of which are hereby fully incorporated herein by reference for all purposes.

FIELD

The present disclosure generally relates to machine learning technology and, more particularly, to methods, devices, and non-transitory computer-readable medium for training a machine learning model by dynamically adjusting training sets.

BACKGROUND

In the field of Speech Emotion Recognition (SER), noise presents a significant challenge. Noise can confuse systems, leading to reduced recognition accuracy. In the real world, to achieve reliable and accurate speech emotion recognition systems, the ability to handle various noisy environments is essential.

Current techniques primarily employ two strategies to address this issue. The first strategy involves noise removal followed by recognition on clean speech data. The second strategy involves training directly on noisy speech data, attempting to enable the system model to accurately recognize speech emotions even in the presence of noise.

In recent years, data augmentation techniques have been widely used in the field of speech emotion recognition to enhance model robustness against noise. These augmentation methods typically predefine noise levels in the training data and then perform static training based on these predefined levels.

However, static training requires prior understanding of the importance of different noise levels in model training to allocate weights to these levels appropriately. Due to many factors, such as application environments and training data distribution, that can impact the importance of different noise levels in model training, such prior knowledge is challenging to obtain. Consequently, static training methods may lead to poor model performance at certain noise levels, thus affecting the overall system performance.

SUMMARY

In view of the above, the present disclosure provides a speech emotion recognition method and system that can effectively learn and handle biases, thereby enhancing the fairness of speech emotion recognition.

A first aspect of the present disclosure provides a computer-implemented method for training a machine learning model. The computer-implemented method includes: sampling from a first training set based on a plurality of weights to train the machine learning model in a first epoch, the first training set including a plurality of levels corresponding to the plurality of weights; evaluating the machine learning model using a validation set after the first epoch to obtain a plurality of first performances at the plurality of levels; updating the plurality of weights corresponding to the plurality of levels based on the plurality of first performances to obtain a plurality of updated weights; and resampling from the first training set, based on the plurality of updated weights, to train the machine learning model in a second epoch which follows the first epoch.

In an implementation of the first aspect, the computer-implemented method further includes: evaluating the machine learning model using the validation set after the second epoch to obtain a plurality of second performances at the plurality of levels; and updating the updated plurality of weights corresponding to the plurality of levels based on the plurality of second performances.

In another implementation of the first aspect, the plurality of updated weights corresponding to the plurality of levels is negatively correlated with the plurality of first performances of the machine learning model at the plurality of levels.

In yet another implementation of the first aspect, each of the plurality of weights and the plurality of updated weights is not less than a predetermined minimum value.

In yet another implementation of the first aspect, the computer-implemented method further includes: mixing noise data into a noise-free training set to generate the first training set.

In yet another implementation of the first aspect, the sampling from the first training set, based on the plurality of weights, to train the machine learning model in the first epoch includes: sampling from the plurality of levels of the first training set based on the plurality of weights to obtain a first sample training set; merging the first sample training set with the noise-free training set to generate a second training set; and using the second training set to train the machine learning model in the first epoch.

In yet another implementation of the first aspect, the first training set includes an ordered data set.

In yet another implementation of the first aspect, the computer-implemented method further includes: dividing the first training set into the plurality of levels based on a distortion index.

In yet another implementation of the first aspect, the machine learning model includes a speech recognition model.

In yet another implementation of the first aspect, the dividing of the first training set into the plurality of levels, based on the distortion index, includes: dividing the first training set into the plurality of levels based on at least one of a Perceptual Evaluation of Speech Quality (PESQ), a Short-Time Objective Intelligibility (STOI), and a Frequency-Weighted Signal-to-Noise Ratio Segmental (fwSNRseq).

A second aspect of the present disclosure, an electronic device is provided. The electronic device includes one or more memories and one or more processors coupled to the one or more memories. The one or more memories store at least one instruction. The at least one instruction, when executed by the one or more processors, cause the electronic device to: sample from a first training set based on a plurality of weights to train the machine learning model in a first epoch, the first training set including a plurality of levels corresponding to the plurality of weights; evaluate the machine learning model using a validation set after the first epoch to obtain a plurality of first performances at the plurality of levels; update the plurality of weights corresponding to the plurality of levels based on the plurality of first performances to obtain a plurality of updated weights; and resample from the first training set, based on the plurality of updated weights, to train the machine learning model in a second epoch which follows the first epoch.

A third aspect of the present disclosure provides a non-transitory computer-readable medium, including at least one instruction, when executed by a processor of an electronic device, causes the electronic device to: sample from a first training set based on a plurality of weights to train the machine learning model in a first epoch, the first training set including a plurality of levels corresponding to the plurality of weights; evaluate the machine learning model using a validation set after the first epoch to obtain a plurality of first performances at the plurality of levels; update the plurality of weights corresponding to the plurality of levels based on the plurality of first performances to obtain a plurality of updated weights; and resample from the first training set, based on the plurality of updated weights, to train the machine learning model in a second epoch which follows the first epoch.

DETAILED DESCRIPTION

The following will refer to the relevant drawings to describe implementations of a battery system for an electric vehicle in the present disclosure, in which the same components will be identified by the same reference symbols.

The following description includes specific information regarding the exemplary implementations of the present disclosure. The accompanying detailed description and drawings of the present disclosure are intended to illustrate the exemplary implementations only. However, the present disclosure is not limited to these exemplary implementations. Those skilled in the art will appreciate that various modifications and alternative implementations of the present disclosure are possible. In addition, the drawings and examples in the present disclosure are generally not drawn to scale and do not correspond to actual relative sizes.

The term "couple" is defined as a connection, whether direct or indirect, through an intermediate component, and is not necessarily limited to a physical connection. When the terms "comprising" or "including" are used, they mean "including but not limited to," and explicitly indicate an open relationship between the combination, group, series, and the like.

The present disclosure provides a training method that may enhance the accuracy of machine learning models. It should be noted that while several implementations of the present disclosure are exemplified through the Speech Emotion Recognition (SER) model, the training method is not limited to any specific machine learning model. Those skilled in the art may apply the training method to any desired machine learning model based on the technical concepts introduced in these implementations.

Figure 1:
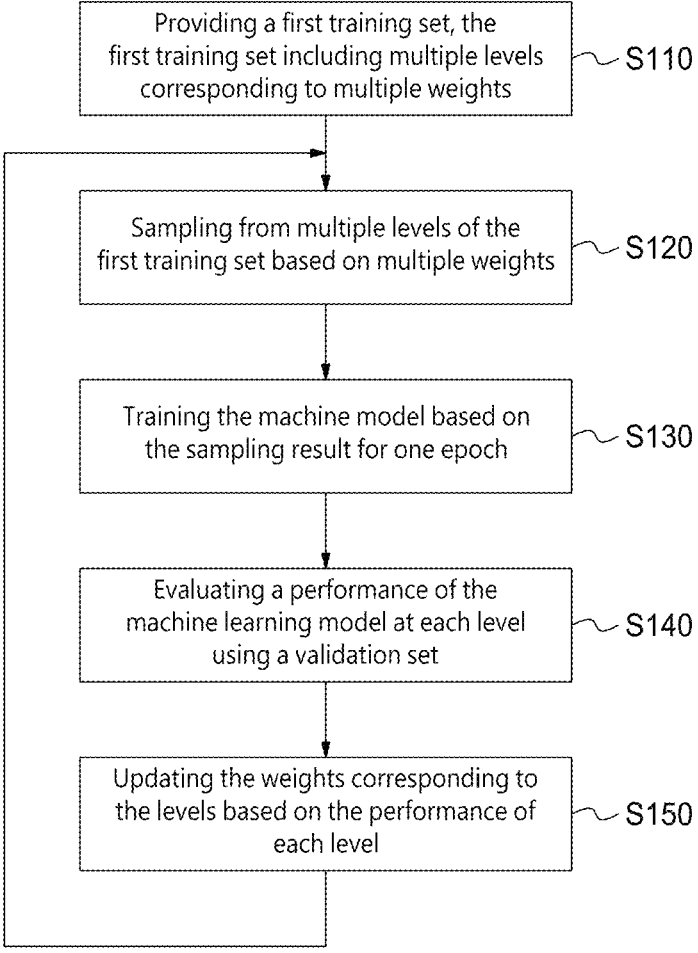
FIG. 1 illustrates a flowchart of a method for training a machine learning model in accordance with an example implementation of the present disclosure.
Figure 2:
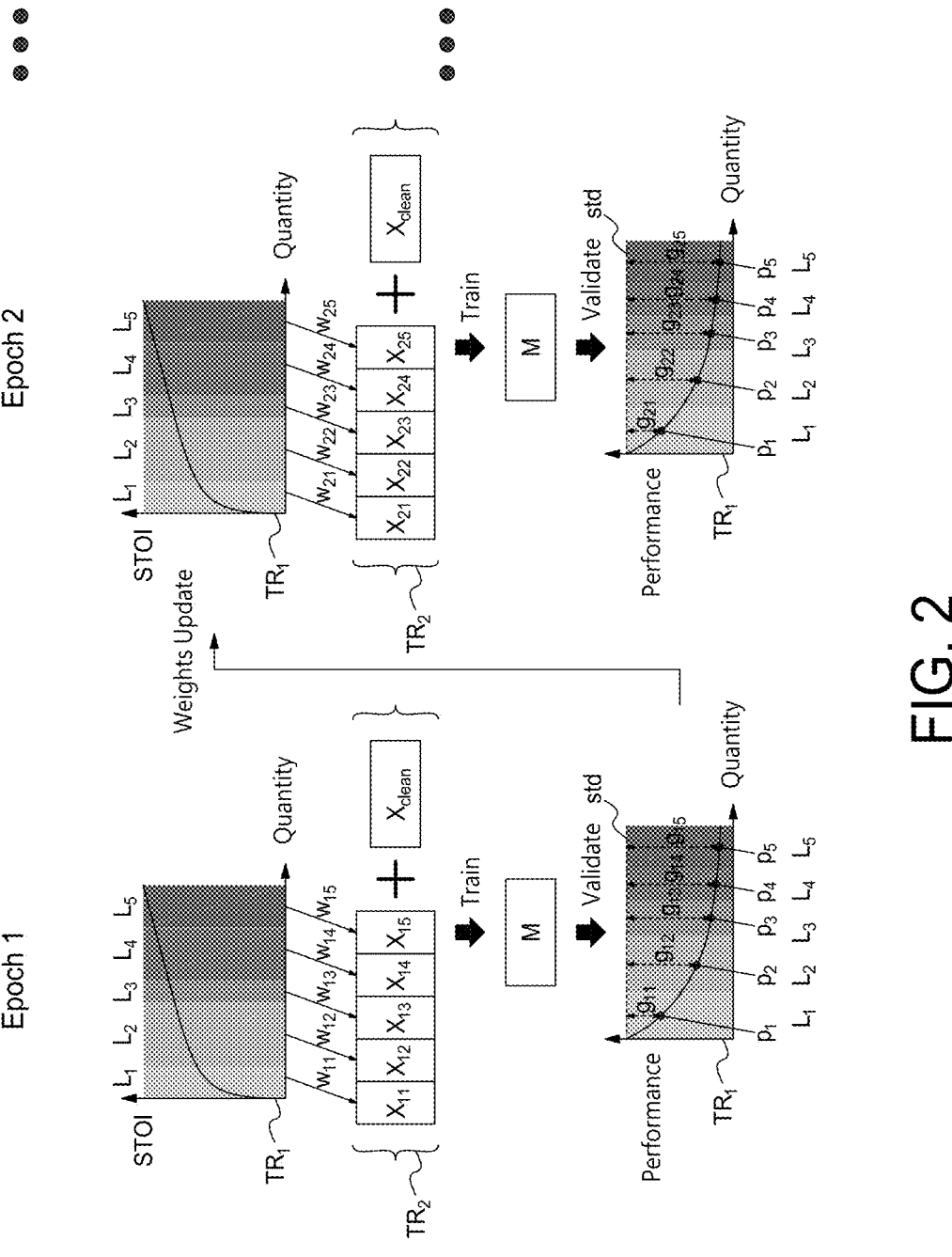
FIG. 2 illustrates a schematic diagram of a method for training a machine learning model in accordance with an example implementation of the present disclosure.

FIG. 1 illustrates a flowchart of a method for training a machine learning model in accordance with an example implementation of the present disclosure. FIG. 2 illustrates a schematic diagram of the method for training the machine learning model in accordance with an example implementation of the present disclosure.

Referring to FIGS. 1 and 2, in action S110, a first training set $TR_1$ may be provided. The first training set $TR_1$ includes multiple levels $L_1$ to $L_5$ (for example, but not limited to, 5 levels), each level corresponding to a weight.

In some implementations, the first training set $TR_1$ may be, for example, an ordered dataset, including multiple pieces of ordered data. Specifically, due to the data type, data in the first training set $TR_1$ may be divided into multiple levels $L_1$ to $L_5$. For instance, the first training set $TR_1$ may include noisy signal data, such as, but not limited to, audio signal data with background noise, music, or speech.

In some implementations, the machine learning model M to be trained, for example, may be a Speech Emotion Recognition model.

It should be noted that as long as data in the first training set is able to be quantified or categorized into multiple levels or categories, the present disclosure does not limit the data type of the first training set. In some implementations, the first training set may be a categorical data set, including multiple pieces of categorical data.

In some implementations, the first training set $TR_1$, for example, may be a training set expanded by mixing noise data of multiple levels with a noise-free training set.

Figure 3:
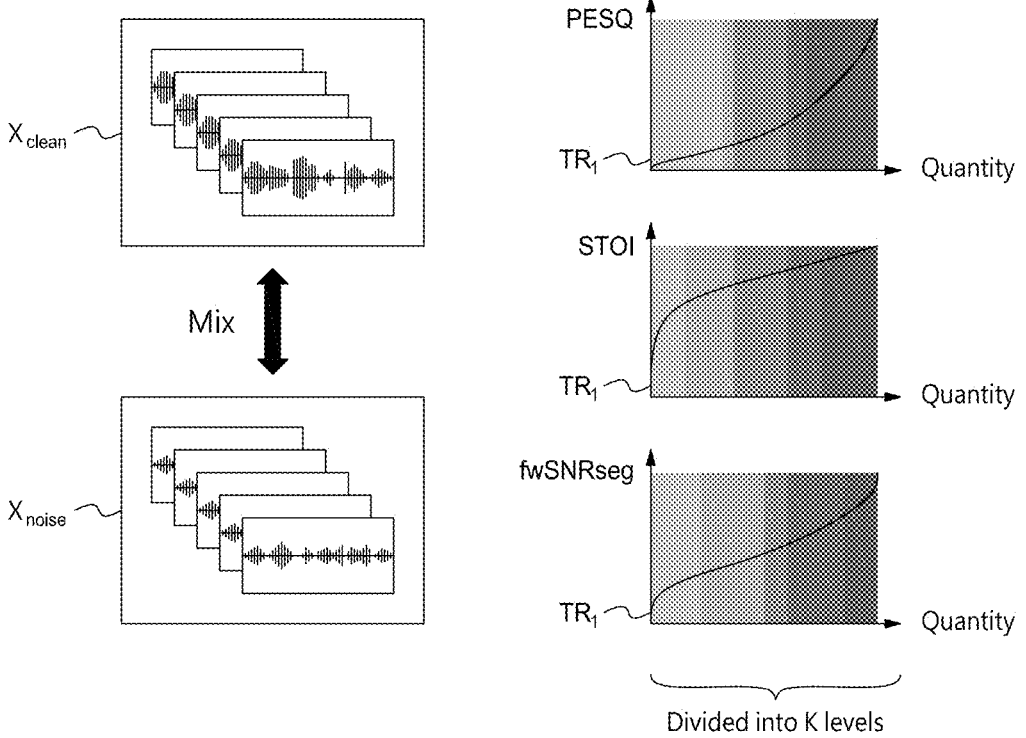
FIG. 3 illustrates a schematic diagram of a generation of an ordered first training set in accordance with an example implementation of the present disclosure.

FIG. 3 illustrates a schematic diagram of a generation of an ordered first training set in accordance with an example implementation of the present disclosure.

Referring to FIG. 3, a noise-free training set $X_{clean}$, for example, may include a speech emotion dataset. For example, the speech emotion dataset may come from the MSP-Podcast corpus, Multimodal EmotionLines Dataset (MELD), or other speech emotion datasets, but the present disclosure is not limited to specific content and source of said speech emotion dataset.

On the other hand, noise data $X_{noise}$, for example, may include data of at least one of noise, music, and speech. For instance, the noise data $X_{noise}$ may come from the Music, Speech, And Noise (MUSAN) dataset, but the present disclosure is not limited to specific content and source of the noise data $X_{noise}$.

In some implementations, the noise-free training set $X_{clean}$ may be mixed, for example, with noise data $X_{noise}$ of different levels to obtain the first training set $TR_1$. After mixing, the quantity of data in the first training set $TR_1$, for example, may be several times (for example, but not limited to, 30 times) the quantity of data in the noise-free dataset $X_{clean}$.

In some implementations, the first training set $TR_1$, for example, may be divided into K levels (for example, but not limited to, K=5) based on a distortion index. The distortion index, for example, may include a combination of one or more of Perceptual Evaluation of Speech Quality (PESQ), Short-Time Objective Intelligibility (STOI), and Frequency-Weighted Signal-to-Noise Ratio Segmental (fwSNRseq), but the present disclosure does not limit the type of distortion index.

In some implementations, the method of dividing the first training set $TR_1$ into K levels may be, for example but not limited to, performed through uniform splitting or a Gaussian Mixture Model (GMM). Therefore, the quantity of data in each level of the first training set $TR_1$ and the clustering method may be related to the data distribution of the first training set $TR_1$.

In the implementations of FIG. 2, the first training set $TR_1$, for example, may be divided into 5 levels $L_1$ to $L_5$ based on Short-Time Objective Intelligibility.

Furthermore, in action S110, each level $L_1$ to $L_5$ may be given an initial weight $w_{11}$ to $w_{15}$, for example. In some implementations, the initial weights may be predefined by the model developer. For example, the initial weights $w_{11}$ to $w_{15}$ for each level $L_1$ to $L_5$ may be the same (for example, $w_{11}=w_{12}=w_{13}=w_{14}=w_{15}=0.2$). However, the present disclosure is not limited herein, the initial weights $w_{11}$ to $w_{15}$ for each level $L_1$ to $L_5$ may also be set differently based on prior knowledge.

In some implementations, to ensure robustness in subsequent training, a minimum weight (for example, but not limited to, 0.05 or 0.1) may be set, and the weight corresponding to each level may not be less than the minimum weight.

In action S120, sampling is performed from multiple levels $L_1$ to $L_5$ of the first training set $TR_1$ based on multiple weights. Specifically, data may be sampled from each level of the first training set $TR_1$ in quantities positively correlated to the corresponding weights, for obtaining the first sample training set.

In some implementations, the quantity of data in the first sample training set may be the same as the quantity of data in the noise-free training set $X_{clean}$. However, the present disclosure is not limited to this. Those skilled in the art may adjust the quantity of data in the first sample training set according to their needs.

Referring to FIG. 2, in some implementations, in- an $n^{th}$ epoch (n is a positive integer) of training the machine learning model M, sampling may be performed from multiple levels $L_1$ to $L_5$ of the first training set $TR_1$ based on multiple weights $W_{n1}$ to $W_{n5}$ to obtain a first sample training set $\{X_{n1}, X_{n2}, X_{n3}, X_{n4}, X_{n5}\}$. In detail, multiple sample data $X_{n1}$ may be sampled from the first level $L_1$ of the first training set $TR_1$; multiple sample data $X_{n2}$ may be sampled from the second level $L_2$ of the first training set $TR_1$; multiple sample data $X_{n3}$ may be sampled from the third level $L_3$ of the first training set $TR_1$; multiple sample data $X_{n4}$ may be sampled from the fourth level $L_4$ of the first training set $TR_1$; and multiple sample data $X_{n5}$ may be sampled from the fifth level $L_5$ of the first training set $TR_1$, where the quantities of sample data $X_{n1}$ to $X_{n5}$ may be positively correlated with the weights $w_{n1}$ to $W_{n5}$.

Returning to FIG. 1, in action S130, the machine learning model M may be trained for an epoch based on the sampling results. Specifically, after sampling once from multiple levels $L_1$ to $L_5$ of the first training set $TR_1$ based on multiple weights $W_{n1}$ to $W_{n5}$, the machine learning model M may be trained for at least one epoch (for example, m epochs, m is a positive integer) based on this sampling result.

Referring to FIG. 2, in some implementations, after sampling from multiple levels $L_1$ to $L_5$ of the first training set $TR_1$ based on multiple weights $W_{n1}$ to $W_{n5}$ to obtain the first sample training set $\{X_{n1}, X_{n2}, X_{n3}, X_{n4}, X_{n5}\}$, the machine learning model M may be trained for the $n^{th}$ epoch based on the first sample training set $\{X_{n1}, X_{n2}, X_{n3}, X_{n4}, X_{n5}\}$.

In some implementations, the first sample training set $\{X_{n1}, X_{n2}, X_{n3}, X_{n4}, X_{n5}\}$ may be merged with the noise-free dataset $X_{clean}$ to generate a second training set $TR_2$. In the $n^{th}$ to the (n+m−1)th epochs, the second training set $TR_2$ may be used to train the machine learning model M.

In some implementations, m equals 1, meaning that sampling is redone for each epoch to train the machine learning model M in the next iteration. However, the present disclosure does not limit the value of m. In some implementations, m may also be determined by the model developer.

Returning to FIG. 1, in action S140, performances $p_1$ to $p_5$ of the machine learning model M at each level $L_1$ to $L_5$ may be evaluated using a validation set.

Specifically, since the data type in the validation set is the same as that in the first training set $TR_1$ and the second training set $TR_2$, the data in the validation set may also be divided into multiple levels $L_1$ to $L_5$, based on the same dividing or classification criteria, as the first training set $TR_1$. In this manner, the validation set may be used to evaluate the performances $p_1$ to $p_5$ of the machine learning model M for the data at each level $L_1$ to $L_5$.

In some implementations, the validation set, for example, may be generated by mixing noise data $X_{noise}$ of multiple levels with a noise-free validation set, but the present disclosure is not limited to this method of generating the validation set.

Referring to FIG. 2, in some implementations, after evaluating the machine learning model M using the validation set, the performances $p_1$ to $p_5$ of the machine learning model M for data at each level $L_1$ to $L_5$ may be obtained. It is evident from FIG. 2 that the performances $p_1$ to $p_5$ of the machine learning model M for data at each level $L_1$ to $L_5$, from low to high distortion, gradually decrease.

In some implementations, the metric used for evaluating performance may be the F1 score, but the present disclosure is not limited to this. In other implementations, other performance metrics such as Accuracy, Precision, or Recall may also be used.

In some implementations, after sampling from multiple levels $L_1$ to $L_5$ of the first training set $TR_1$ based on multiple weights $W_{n1}$ to $W_{n5}$, the machine learning model M may be trained for m epochs. After completing training in the (n+m−1)th epoch, the performances $p_1$ to $p_5$ of the machine learning model M at each level $L_1$ to $L_5$ may be evaluated using the validation set, and then the process may proceed to action S150.

In some implementations, m may equal 1. After sampling from multiple levels $L_1$ to $L_5$ of the first training set $TR_1$ based on multiple weights $W_{n1}$ to $W_{n5}$, the machine learning model M may be trained for one epoch. After completing training in this one epoch, the performances $p_1$ to $p_5$ of the machine learning model M at each level $L_1$ to $L_5$ may be evaluated using the validation set, and then the process may proceed to action S150.

In some implementations, after sampling from multiple levels $L_1$ to $L_5$ of the first training set $TR_1$ based on multiple weights $w_{n1}$ to $W_{n5}$ and training the machine learning model M for m epochs based on the sampling result, the performances $p_1$ to $p_5$ of the machine learning model M at each level $L_1$ to $L_5$ may be evaluated after each epoch of training, and then proceed to action S150 after the evaluation of the (n+m−1)th epoch. In this scenario, m may be determined, for example, by the assessed performances $p_1$ to $p_5$ after each epoch.

For example, in a case that the consistency of performances $p_1$ to $p_5$ for levels $L_1$ to $L_5$ is too low, the low consistency may indicate that training for specific levels of data may need to be intensified, hence proceeding to action S150 for updating weights and subsequent resampling.

For example, in a case that the proportion of performances $p_1$ to $p_5$ for levels $L_1$ to $L_5$ is close or similar to the proportion of performances for levels before the previous sampling, the similar proportions may indicate that updating weights and resampling might have limited effect or significance, and thus, training may continue for the next epoch.

For example, in a case that the performances $p_1$ to $p_5$ for levels $L_1$ to $L_5$ all reach a preset threshold, training may be concluded.

In other words, the number of epochs m for training the machine learning model M, based on a single sampling result, may be dynamically determined, based on the assessed performances $p_1$ to $p_5$ for levels $L_1$ to $L_5$, after each epoch, but the present disclosure is not limited to this.

Returning to FIG. 1, in action S150, the weights corresponding to each level $L_1$ to $L_5$ may be updated based on the performances $p_1$ to $p_5$, and then the process may return to action S120 for resampling.

Specifically, since the weights are updated, returning to action S120 for resampling may allow the distribution of training data for the machine learning model M to be dynamically adjusted during the training process (e.g., according to the updated weights). In a case that the machine learning model M shows lower performance for data at a specific level, the lower performance may indicate a need for a higher proportion of data from that specific level for learning. Therefore, updating the weights corresponding to each level $L_1$ to $L_5$, based on the assessed performances $p_1$ to $p_5$, in action S140 may dynamically adjust the training data distribution.

In some implementations, to ensure robustness in subsequent training, a minimum weight may be set (for example, but not limited to, 0.05 or 0.1), and the updated weights for each level will not be less than this minimum weight.

In some implementations, the sum of the multiple weights corresponding to multiple levels $L_1$ to $L_5$ may, for example, equal to 1.

In some implementations, the updated weights $w_{(n+m)1}$ to $w_{(n+m)5}$ for each level $L_1$ to $L_5$ may be negatively correlated with the performances $p_1$ to $p_5$ assessed in action S140.

In some implementations, the updated weights $w_{(n+m)1}$ to $w_{(n+m)5}$ may be, for example, positively correlated with the inverse of the performances $p_1$ to $p_5$.

Referring to FIG. 2, in some implementations, action 140 may also involve using a noise-free validation set to evaluate the standard performance (std) of the machine learning model M for the noise-free validation set. To increase the weights for levels with lower performance, the differences $g_{(n+m-1)1}$ to $g_{(n+m-1)5}$ between the standard performance std and the performances $p_1$ to $p_5$ for data at each level $L_1$ to $L_5$ may be calculated, and the updated weights $w_{(n+m)1}$ to $w_{(n+m)5}$ may be made positively correlated with these differences $g_{(n+m-1)1}$ to $g_{(n+m-1)5}$.

In some implementations, m may equal 1. After completing training and evaluating the performance of the machine learning model M in the $n^{th}$ epoch, the differences $g_{n1}$ to $g_{n5}$ between the standard performance std and the performances $p_1$ to $p_5$ for data at each level $L_1$ to $L_5$ may be calculated, and the updated weights $w_{(n+1)1}$ to $w_{(n+1)5}$ may be made positively correlated with the differences $g_{n1}$ to $g_{n5}$.

Returning to FIG. 1, after updating the weights, the process may return to action S120 for resampling and then to retrain the machine learning model M for at least one epoch in action S130. This process may continue until training is completed.

Table 1 includes a comparison of the accuracy of a Speech Emotion Recognition (SER) model trained using the method introduced in the implementations of the present disclosure (referred to as "this method" in the table) with traditional training methods. The metric used, for example, is the weighted F1 score. In the experiments for establishing Table 1, Short-Time Objective Intelligibility (STOI) was used as the distortion index to divide the first training set into multiple levels, and m was set to 1 for updating weights in each epoch.

TABLE 1

| Dataset | MSP-Podcast | | | MELD | | |
|---|---|---|---|---|---|---|
| Training Method | Traditional training method | | This | Traditional training method | | This |
| Distortion index | Noise-free | Fixed S/N ratio | method STOI | Noise-free | Fixed S/N ratio | method STOI |
| Noise-free | 59.56 | 60.72 | 61.70 | 58.48 | 50.59 | 52.85 |
| Unseen noise | 55.03 | 59.78 | 60.09 | 49.56 | 50.87 | 51.98 |
| SNR = 10 dB | 54.88 | 59.61 | 60.16 | 49.58 | 50.4 | 51.66 |
| SNR = 5 dB | 51.58 | 58.14 | 58.85 | 47.96 | 50.05 | 50.53 |
| SNR = 0 dB | 47.79 | 55.64 | 56.95 | 46.20 | 49.95 | 49.23 |

From Table 1, it is evident that, with or without applying the MSP-Podcast or MELD datasets, the SER model trained, according to the method for training machine learning model that is introduced in the implementations of the present disclosure, demonstrates better performance on almost every level of data distortion (e.g., on noise-free, unseen noise, 10 dB SNR, 5 dB SNR, 0 dB SNR, etc.), when compared to traditional training methods.

Figure 4:
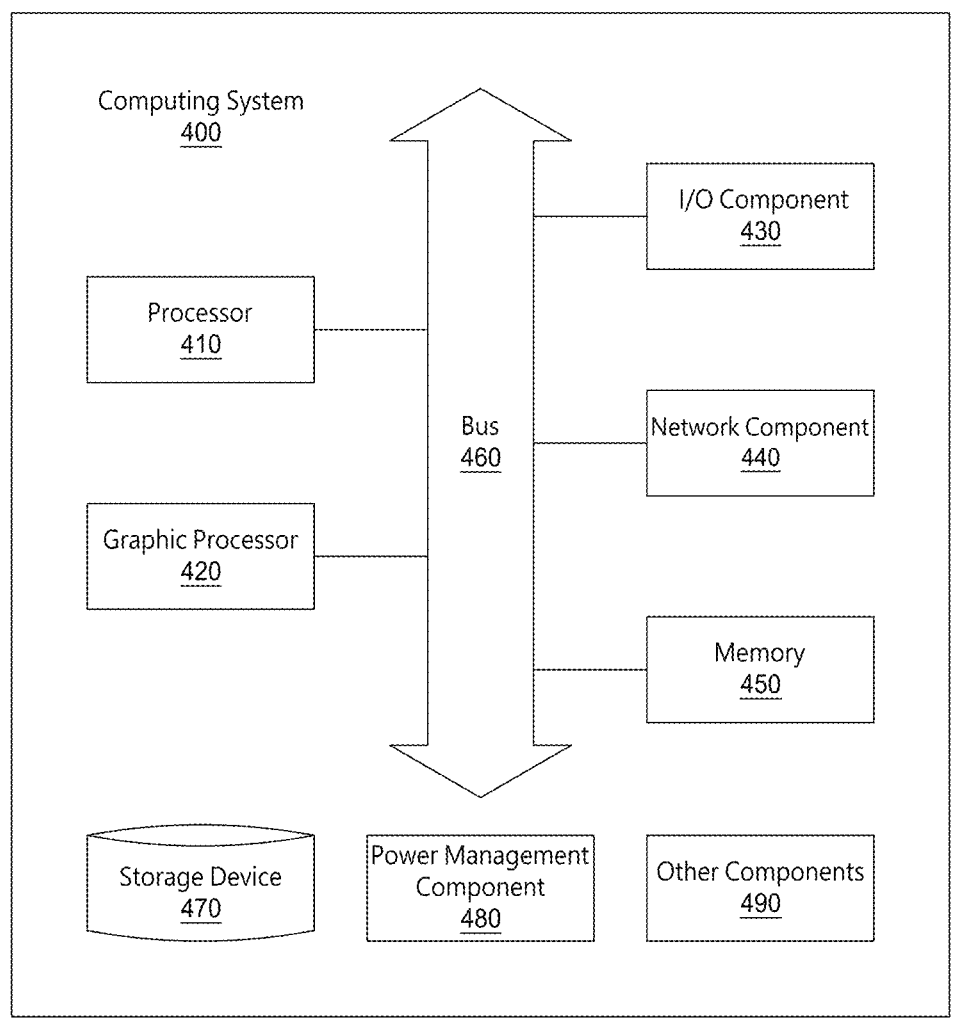
FIG. 4 illustrates a block diagram of a computing system in accordance with an example implementation of the present disclosure.

FIG. 4 illustrates a block diagram of a computing system in accordance with an example implementation of the present disclosure.

Referring to FIG. 4, computer-implemented methods, such as methods for training the machine learning model that is introduced in the present disclosure, as well as other computer-implemented methods, may be implemented on a computing system 400 with various hardware components. In some implementations, the computing system 400 may be implemented in the form of an electronic device, which may include, but is not limited to, one or more of the following components: a processor (e.g., Central Processing Unit (CPU)) 410, a processor (Graphics Processing Unit, GPU) 420, input/output components 430, network components 440, and a memory 450. These components may communicate and transfer data via a system bus 460. However, the present disclosure does not limit the specific models, quantities, and configurations of these components. Those skilled in the art can adjust, select, or add/subtract components based on the specific requirements and operating environment when implementation.

In some implementations, the primary computing core inside the computing system 400 is one or more processors 410. This processor 410 may be responsible for running the main computational processes and related control logic of algorithms such as deep learning. In some implementations, the processor 410 may be configured to execute processing instructions (e.g., machine/computer-executable instructions) stored in non-volatile computer-readable media (e.g., storage device 470).

In some implementations, to enhance the computational efficiency of deep learning, the computing system 400 may also include one or more graphics processing unis 420 designed for massive parallel computations. The graphics processing unit 420 may effectively improve the system's computational capacity during deep learning training and inference.

In some implementations, the computing system 400 may include various input/output components 430 configured to receive user input and display system output. For example, the input/output components 430 may include a keyboard, mouse, touchpad, display screen, speakers, and other types of sensing devices.

In some implementations, the computing system 400 may also include network components 440 configured for network communication. For example, the network component 440 may include a network interface card for wired or wireless network connections, or communication modules for 3G, 4G, 5G, or other wireless communication technologies.

In some implementations, the computing system 400 may include one or more memory components 450, such as volatile memory components like Random Access Memory (RAM). The memory 450 may store the parameters of the deep learning model, as well as other data and programs used to run algorithms like deep learning.

Furthermore, the computing system 400 may also include one or more of the following components: storage devices 470, power management components 480, and other (e.g., hardware) components 490.

In some implementations, the computing system 400 may include one or more storage devices 470, such as non-volatile memory components like Hard Disk Drive (HDD) or Solid State Drive (SSD). The storage devices 470 may be configured to store the code of deep learning software, training data, model parameters, etc. Additionally, storage devices 470 may also be configured to store intermediate results and final outputs of algorithms like deep learning.

In some implementations, the computing system 400 may include one or more power management components 480, configured to provide power to various hardware components of the computing system 400 and manage their power consumptions. This power management component 480 may include batteries, power converters, and other power management devices.

In some implementations, the computing system 400 may also include other (e.g., hardware) components 490, such as cooling fans, heat dissipators, and other various control and monitoring devices. The present disclosure is not limited in this regard.

Additionally, implementations of the present disclosure may also be implemented as one or more computer program products or one or more non-transitory computer-readable medium, which include one or more instructions of a computer program. Specifically, the computer program (also referred to as a program, software, script, or code) may be presented in any form of programming language and can be deployed in any form. During the operation of the computing system 400 (e.g., electronic device), the instructions or part of them may reside entirely or at least partially inside the processor 410, allowing the processor 410 to execute the methods introduced in the disclosure.

In summary, the method, device, and non-transitory computer-readable medium for training a machine learning model provided in the implementations of the present disclosure involve dynamically adjusting the data distribution of the training set, based on the evaluation results of the validation set, during the training process. Consequently, the robustness of the trained machine learning model may be enhanced, thus enabling the trained machine learning model to perform well on input data with various levels of noise.

Based on the above description, it is apparent that various techniques can be configured to implement the concepts described in this application without departing from their scope. Furthermore, although certain implementations have been specifically described and illustrated, those skilled in the art will recognize that variations and modifications can be made in form and detail without departing from the scope of the concepts. Thus, the described implementations are to be considered in all respects as illustrative and not restrictive. Moreover, it should be understood that this application is not limited to the specific implementations described above, but many rearrangements, modifications, and substitutions can be made within the scope of the present disclosure.

What is claimed is:

1. A computer-implemented method for training a machine learning model comprising:
    sampling from a first training set, based on a plurality of weights, to train the machine learning model in a first epoch, the first training set comprising a plurality of levels corresponding to the plurality of weights;
    evaluating the machine learning model using a validation set after the first epoch to obtain a plurality of first performances at the plurality of levels;
    updating the plurality of weights corresponding to the plurality of levels based on the plurality of first performances to obtain a plurality of updated weights; and
    resampling from the first training set, based on the plurality of updated weights, to train the machine learning model in a second epoch, wherein the second epoch follows the first epoch.

2. The computer-implemented method of claim 1, further comprising:
    evaluating the machine learning model using the validation set after the second epoch to obtain a plurality of second performances at the plurality of levels; and
    updating the plurality of updated weights corresponding to the plurality of levels based on the plurality of second performances.

3. The computer-implemented method of claim 1, wherein the plurality of updated weights corresponding to the plurality of levels is negatively correlated with the plurality of first performances of the machine learning model at the plurality of levels.

4. The computer-implemented method of claim 3, wherein each of the plurality of updated weights is equal to or more than a predetermined minimum value.

5. The computer-implemented method of claim 1, further comprising:
    mixing noise data into a noise-free training set to generate the first training set.

6. The computer-implemented method of claim 5, wherein the sampling from the first training set, based on the plurality of weights, to train the machine learning model in the first epoch comprises:
    sampling from the plurality of levels of the first training set based on the plurality of weights to obtain a first sample training set;
    merging the first sample training set with the noise-free training set to generate a second training set; and
    using the second training set to train the machine learning model in the first epoch.

7. The computer-implemented method of claim 1, wherein the first training set comprises an ordered data set.

8. The computer-implemented method of claim 1, further comprising:
    dividing the first training set into the plurality of levels based on a distortion index.

9. The computer-implemented method of claim 8, wherein the machine learning model comprises a speech recognition model.

10. The computer-implemented method of claim 9, wherein the dividing of the first training set into the plurality of levels, based on the distortion index, comprises:

dividing the first training set into the plurality of levels based on at least one of a Perceptual Evaluation of Speech Quality (PESQ), a Short-Time Objective Intelligibility (STOI), and a Frequency-Weighted Signal-to-Noise Ratio Segmental (fwSNRseq).

11. An electronic device comprising:

one or more memories storing at least one instruction; and one or more processors coupled to the one or more memories, wherein the at least one instruction, when executed by the one or more processors, causes the electronic device to:

sample from a first training set, based on a plurality of weights, to train a machine learning model in a first epoch, the first training set comprising a plurality of levels corresponding to the plurality of weights;

evaluate the machine learning model using a validation set after the first epoch to obtain a plurality of first performances at the plurality of levels;

update the plurality of weights corresponding to the plurality of levels based on the plurality of first performances to obtain a plurality of updated weights; and resample from the first training set, based on the plurality of updated weights, to train the machine learning model in a second epoch, wherein the second epoch follows the first epoch.

12. The electronic device of claim 11, wherein the at least one instruction, when executed by the one or more processors, further causes the electronic device to:

evaluate the machine learning model using the validation set after the second epoch to obtain a plurality of second performances at the plurality of levels; and update the plurality of updated weights corresponding to the plurality of levels based on the plurality of second performances.

13. The electronic device of claim 11, wherein the plurality of updated weights corresponding to the plurality of levels is negatively correlated with the plurality of first performances of the machine learning model at the plurality of levels.

14. The electronic device of claim 13, wherein each of the plurality of weights and the plurality of updated weights is equal to or more than a predetermined minimum value.

15. The electronic device of claim 11, wherein the at least one instruction, when executed by the one or more processors, further cause the electronic device to:

mix noise data into a noise-free training set to generate the first training set.

16. The electronic device of claim 15, wherein the sampling from the first training set, based on the plurality of weights, to train the machine learning model in the first epoch comprises:

sampling from the plurality of levels of the first training set based on the plurality of weights to obtain a first sample training set;

merging the first sample training set with the noise-free training set to generate a second training set; and using the second training set to train the machine learning model in the first epoch.

17. The electronic device of claim 11, wherein the first training set comprises an ordered data set.

18. The electronic device of claim 11, wherein the at least one instruction, when executed by the one or more processors, further cause the electronic device to:

divide the first training set into the plurality of levels based on a distortion index.

19. The electronic device of claim 18, wherein the machine learning model comprises a speech recognition model.

20. The electronic device of claim 19, wherein the dividing of the first training set into the plurality of levels, based on the distortion index, comprises:

dividing the first training set into the plurality of levels based on at least one of a Perceptual Evaluation of Speech Quality (PESQ), a Short-Time Objective Intelligibility (STOI), and a Frequency-Weighted Signal-to-Noise Ratio Segmental (fwSNRseq).

21. A non-transitory computer-readable medium, comprising at least one instruction, when executed by a processor of an electronic device, causes the electronic device to:

sample from a first training set, based on a plurality of weights, to train a machine learning model in a first epoch, the first training set comprising a plurality of levels corresponding to the plurality of weights;

evaluate the machine learning model using a validation set after the first epoch to obtain a plurality of first performances at the plurality of levels;

update the plurality of weights corresponding to the plurality of levels based on the plurality of first performances to obtain a plurality of updated weights; and resample from the first training set, based on the plurality of updated weights, to train the machine learning model in a second epoch, wherein the second epoch follows the first epoch.

\* \* \* \* \*